US012573959B2

(12) United States Patent
Lee

(10) Patent No.: US 12,573,959 B2
(45) Date of Patent: Mar. 10, 2026

(54) POWER CONVERTER AND POWER CONVERSION SYSTEM

(71) Applicant: LITE-ON Technology Corporation, Taipei City (TW)

(72) Inventor: Kuan-Fu Lee, Taipei City (TW)

(73) Assignee: LITE-ON Technology Corporation, Taipei City (TW)

( * ) Notice: Subject to any disclaimer, the term of this patent is extended or adjusted under 35 U.S.C. 154(b) by 260 days.

(21) Appl. No.: 18/604,534

(22) Filed: Mar. 14, 2024

(65) Prior Publication Data

US 2024/0421713 A1     Dec. 19, 2024

(30) Foreign Application Priority Data

Jun. 15, 2023     (TW) ................................. 112122468

(51) Int. Cl.
| | |
|---|---|
| *H02M 3/335* | (2006.01) |
| *H02J 7/00* | (2006.01) |
| *H02J 7/34* | (2006.01) |
| *H02J 9/06* | (2006.01) |
| *H02M 1/42* | (2007.01) |

(52) U.S. Cl.
CPC ....... *H02M 3/33569* (2013.01); *H02J 7/0024* (2013.01); *H02J 7/345* (2013.01); *H02J 9/061* (2013.01); *H02M 1/4208* (2013.01)

(58) Field of Classification Search
CPC .. H02M 3/33569; H02M 1/4208; H02J 9/061; H02J 7/0024; H02J 7/345; H02J 2207/50
See application file for complete search history.

(56) References Cited

U.S. PATENT DOCUMENTS

| | | | | |
|---|---|---|---|---|
| 5,563,777 | A * | 10/1996 | Miki ................. | H02M 7/53832 363/124 |
| 5,771,168 | A * | 6/1998 | Liao .................... | H02M 1/4258 323/222 |
| 6,538,906 | B1 * | 3/2003 | Ke ....................... | H02M 1/0096 363/21.02 |
| 9,602,009 | B1 * | 3/2017 | Bäurle .................... | H02M 1/10 |
| 10,097,109 | B1 * | 10/2018 | Ye ...................... | H02M 7/53871 |
| 11,496,053 | B2 * | 11/2022 | Zhang ............... | H02M 3/33573 |

(Continued)

FOREIGN PATENT DOCUMENTS

| | | |
|---|---|---|
| CN | 108702098 A | 10/2018 |
| CN | 113541476 A | 10/2021 |

*Primary Examiner* — Yusef A Ahmed

(57)          ABSTRACT

A power converter and a power conversion system are provided. The power converter includes a hold time circuit and a conversion circuit. The hold time circuit includes a first energy storage, a second energy storage, a first charging unit, a second charging unit and a first switching unit, wherein the first energy storage, the second energy storage, a first charging unit and the second charging unit are sequentially formed in cascaded connection, wherein the first switching unit being in parallel with the series path formed by the first charging unit and the second charging unit. The conversion circuit and the hold time circuit are electrically connected. When the first switching unit of the hold time circuit is turned on, the first energy storage unit of the hold time circuit and the second energy storage unit of the hold time circuit are connected in series and discharged to the conversion circuit.

14 Claims, 20 Drawing Sheets

(56) References Cited

U.S. PATENT DOCUMENTS

| | | | |
|---|---|---|---|
| 2002/0114176 A1* | 8/2002 | Morita | H02M 1/14 |
| | | | 363/95 |
| 2003/0002301 A1* | 1/2003 | Yamagishi | H02M 3/33576 |
| | | | 363/21.12 |
| 2003/0103362 A1* | 6/2003 | Gan | H02M 3/33538 |
| | | | 363/25 |
| 2004/0156217 A1* | 8/2004 | Phadke | H02M 3/33569 |
| | | | 363/21.16 |
| 2004/0218405 A1* | 11/2004 | Yamada | H02M 3/33507 |
| | | | 363/18 |
| 2005/0001561 A1* | 1/2005 | Sumarokov | H05B 41/2921 |
| | | | 315/266 |
| 2006/0104097 A1* | 5/2006 | Tsuruya | H02M 3/155 |
| | | | 363/55 |
| 2012/0051108 A1* | 3/2012 | Leu | H02M 7/48 |
| | | | 363/126 |
| 2013/0194831 A1* | 8/2013 | Hu | H02M 3/33507 |
| | | | 363/21.01 |
| 2013/0279205 A1* | 10/2013 | Keung | H02M 3/33507 |
| | | | 363/21.02 |
| 2014/0247626 A1* | 9/2014 | Lee | H02M 3/33523 |
| | | | 363/21.02 |
| 2015/0303788 A1* | 10/2015 | Leu | H02M 7/539 |
| | | | 363/84 |
| 2020/0044559 A1* | 2/2020 | Leu | H02M 1/15 |
| 2020/0287471 A1* | 9/2020 | Huang | H02M 3/33561 |
| 2021/0194374 A1* | 6/2021 | Deng | H02M 7/217 |
| 2021/0194377 A1* | 6/2021 | Deng | H02M 1/4241 |
| 2022/0085728 A1* | 3/2022 | Mantooth | H02M 1/0058 |

* cited by examiner

AC      1      2      A

| ALTERNATING CURRENT | → | HOLD TIME CIRCUIT | → | CONVERSION CIRCUIT | → | EXTERNAL LOAD |

POWER CONVERTER AND POWER CONVERSION SYSTEM

CROSS-REFERENCE TO RELATED APPLICATION

This application claims the priority benefit of Taiwanese Patent Application Serial Number 112122468, filed on Jun. 15, 2023, the full disclosure of which is incorporated herein by reference.

BACKGROUND

Technical Field

The present invention relates to a power converter, and in particular, to a power converter and a power conversion system with a hold time circuit.

Related Art

In the existing technology, half-wave rectification or full-wave rectification according to the needs is adopted to rectify the alternating current (AC). When requirements for the stability of the voltage source are high, full-wave rectification is mostly used for rectification. The most common full-wave rectification method is the full-bridge rectifier. However, the diodes in the loop of the full-bridge rectifier are in a conducting state during the positive half cycle or the negative half cycle of the AC power supply, thereby result-ing in a certain power loss for the full-bridge rectifier.

In order to reduce the power loss in the full-bridge rectifier, the bridgeless architecture is introduced. However, power factor correction (PFC) circuits are frequently con-figured using the bridgeless architecture, it is rare to find someone designing a bridgeless flyback architecture (Brid-geless Flyback) using the bridgeless architecture.

Most single-stage flyback converters combine the func-tions of a power factor correction circuit and a flyback converter. Compared with the traditional two-stage archi-tecture, it can reduce the size and cost. However, a general single-stage flyback converters stop operating immediately after the AC power is off. If used in IT power products, it would cause malfunctions.

Therefore, the technical difficulty that the inventor of the present invention intends to solve and overcome is that the load elements stop operation after the AC power is off in the existing technology, so that the bridgeless single-stage fly-back converter can have the effect of extending the holding time.

SUMMARY

The embodiments of the present disclosure provide a power converter and a power conversion system, which can effectively extend the holding time after the power is off, so that the load elements connected at the subsequent stage can continue to operate when the power is off.

In one aspect of the disclosure, a power converter includes a hold time circuit and a conversion circuit. The hold time circuit includes a first energy storage unit, a second energy storage unit, a first charging unit, a second charging unit and a first switching unit, wherein the first energy storage unit, the second energy storage unit, the first charging unit and the second charging unit are connected in series, and the first switching unit is connected in parallel with the series path formed by the first charging unit and the second charging unit. The conversion circuit is electrically connected to the hold time circuit; wherein when the first switching unit is turned on, the first energy storage unit and the second energy storage unit are connected in series and discharge to the conversion circuit.

In another aspect of the disclosure, a power conversion system, electrically connected to a load, includes a hold time circuit and a conversion circuit. The hold time circuit is electrically connected to an AC power and comprising a first energy storage unit, a second energy storage unit, a first charging unit, a second charging unit and a first switching unit, wherein the first energy storage unit, the second energy storage unit, the first charging unit and the second charging unit are connected in series, and the first switching unit is connected in parallel with the series path formed by the first charging unit and the second charging unit. The conversion circuit is electrically connected to the hold time circuit; wherein when the first switching unit is turned on, the first energy storage unit and the second energy storage unit are connected in series and discharge to the conversion circuit.

By turning on the first switching unit, the first energy storage unit and the second energy storage unit are con-nected in series and discharge to the conversion circuit, so that the present invention can achieve the effect of extending the holding time.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of opera-tion, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

Figure 1:
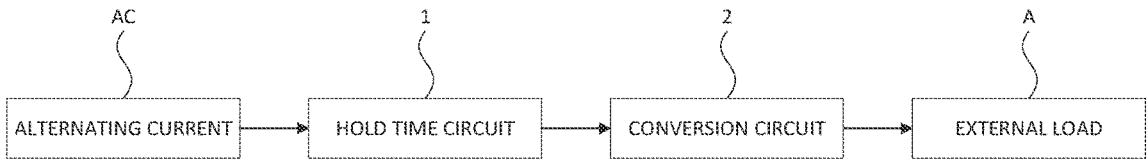
FIG. 1 is a schematic block diagram of a first embodiment of the present invention.
Figure 2:
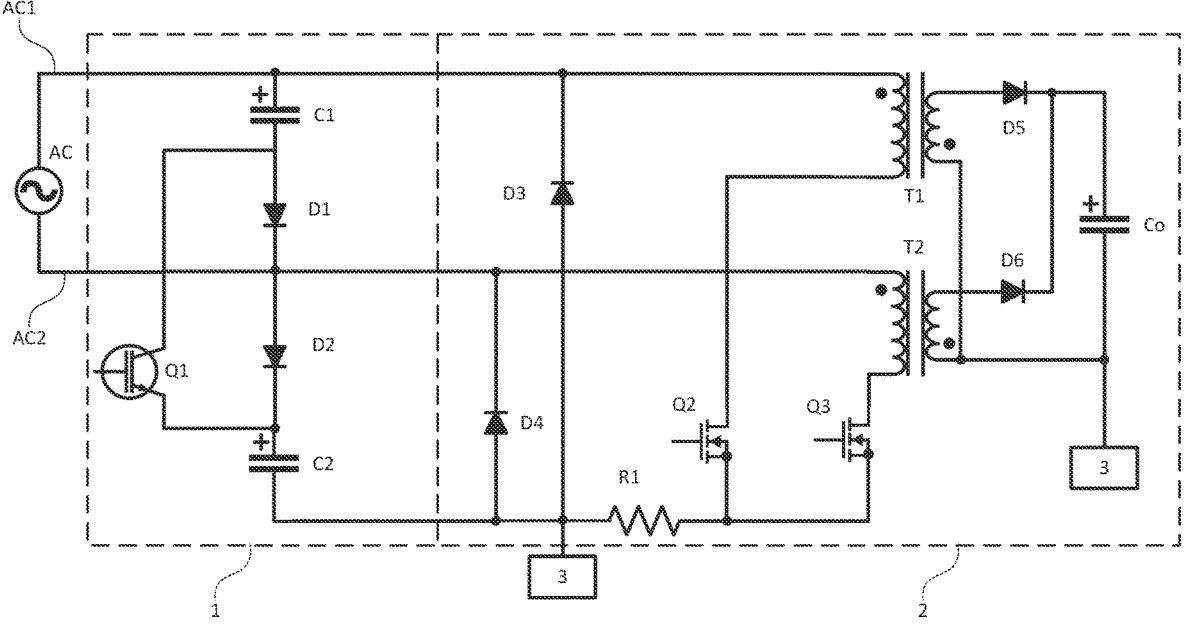
FIG. 2 is a schematic structural diagram of the first embodiment of the present invention.

Refer to FIG. 1 and FIG. 2 regarding the power conversion system of the first embodiment of the present invention. The power conversion system includes an alternating current power supply AC, a hold time circuit 1, a conversion circuit 2 and an external load A. The AC power supply AC has a first terminal AC1 and a second terminal AC2. The AC power supply AC has a positive half cycle and a negative half cycle. The positive half cycle has a first time and a second time and the negative half cycle has a third time and a fourth time. The hold time circuit 1 is connected to the first terminal AC1 and the second terminal AC2 of the AC power supply AC. One side of the conversion circuit 2 is coupled to the hold time circuit 1, and the other side of the conversion circuit 2 is connected to the external load A.

In this embodiment, the hold time circuit 1 and the conversion circuit 2 constitute a power converter. The hold time circuit 1 is configured with a first energy storage unit C1, a first charging unit D1, a second energy storage unit C2, a second charging unit D2 and a first switching unit Q1. The first energy storage unit C1, the second energy storage unit C2, the first charging unit D1 and the second charging unit D2 are connected in series. The first switching unit Q1 is connected in parallel with the series path formed by the first charging unit D1 and the second charging unit D2. The conversion circuit 2 is electrically connected to the hold time circuit 1. When the first switching unit Q1 of the hold time circuit 1 is turned on, the first energy storage unit C1 and the second energy storage unit C2 are connected in series and discharge to the conversion circuit 2. In this embodiment, the AC power supply AC charges the first energy storage unit C1 during the positive half cycle, and the AC power supply AC charges the second energy storage unit C2 during the negative half cycle.

In this embodiment, the hold time circuit 1 may also include a second switching unit Q2 and a third switching unit Q3. The second switching unit Q2 is connected in parallel with the series path formed by the first charging unit D1, the second charging unit D2 and the second energy storage unit C2. The third switching unit Q3 is connected in parallel with the series path formed by the first energy storage unit C1, the first charging unit D1 and the second charging unit D2. When the first switching unit Q1 is turned off, and the second switching unit Q2 and the third switching unit Q3 are both turned on, the first energy storage unit C1 and the second energy storage unit C2 are connected in parallel and discharge to the conversion circuit 2.

Alternatively, in this embodiment, the second switching unit Q2 and the third switching unit Q3 may not be configured in the hold time circuit 1 and form another power converter. In this embodiment, the conversion circuit 2 may further be configured with a first transformer T1, a second transformer T2, the second switching unit Q2, the third switching unit Q3, a first unidirectional conduction unit D3, a second Unidirectional conduction unit D4, a third unidirectional conduction unit D5, a fourth unidirectional conduction unit D6 and an output capacitor Co. The primary side of the first transformer T1 is electrically connected to the first energy storage unit C1, the first unidirectional conduction unit D3, the second switching unit Q2 and the AC power supply AC. The secondary side of the first transformer T1 is electrically connected to the third unidirectional conducting unit D5 and the output capacitor Co. The primary side of the second transformer T2 is electrically connected to the first charging unit D1, the second charging unit D2, the second unidirectional conduction unit D4, the third switching unit Q3 and the AC power supply AC.

In this embodiment, the positive half cycle of the AC power supply AC has a first time and a second time, and the negative half cycle of the AC power supply AC has a third time and a fourth time. At the first time, the second switching unit Q2 is turned on and the first transformer T1 stores energy. At the first time, the second switching unit Q2 is turned off and the first transformer T1 releases its stored energy; at the second time, the second switching unit Q2 is turned off and the first transformer T1 releases its stored energy. At the third time, the third switching unit Q3 is turned on and the second transformer T2 stores energy. At the fourth time, the third switching unit Q3 is turned off and the second transformer T2 releases its stored energy.

Detailed description of the power conversion system of this embodiment is given as follows. The first energy storage unit C1 and the second energy storage unit C2 of the hold time circuit 1 have a positive terminal and a negative terminal respectively. The first charging unit D1 and the second charging unit D2 have an anode and a cathode respectively. The anode of the first charging unit D1 and the anode of the second charging unit D2 are respectively composed of a P terminal. The cathode of the first charging unit D1 and the cathode of the second charging unit D2 are respectively composed of a N terminal. The positive terminal of the first energy storage unit C1 is electrically connected to the first terminal AC1 of the AC power supply AC. The negative terminal of the first energy storage unit C1 is connected to the anode (P terminal) of the first charging unit D1. The cathode (N terminal) of the first charging unit D1 is connected to the second terminal AC2 of the AC power supply AC and the anode (P terminal) of the second charging unit D2. The cathode (N terminal) of the second charging unit D2 is connected to the positive terminal of the second energy storage unit C2. The negative terminal of the second energy storage unit C2 is connected to a ground 3. One end of the first switching unit Q1 is provided between the negative terminal of the first energy storage unit C1 and the anode (P terminal) of the first charging unit D1. The other terminal of the first switching unit Q1 is provided between the cathode (N terminal) of the second charging unit D2 and the anode terminal of the second energy storage unit C2.

The first transformer T1 and the second transformer T2 of the conversion circuit 2 respectively have a primary side and a secondary side. The first unidirectional conduction unit D3, the second unidirectional conduction unit D4, the third unidirectional conduction unit D5 and the fourth unidirectional conduction unit D6 are provided with an anode and a cathode respectively. The anodes and cathodes of the first unidirectional conduction unit D3, the second unidirectional conduction unit D4, the third unidirectional conduction unit D5 and the fourth unidirectional conduction unit D6 are composed of a P terminal and an N terminal respectively. The output capacitor Co has a positive terminal and a negative terminal. One terminal of the primary side of the first transformer T1 is configured at the first terminal AC1 of the AC power supply AC. The other terminal of the primary side of the first transformer T1 is connected to one terminal of the second switching unit Q2. The other terminal of the second switching unit Q2 is connected to one terminal of the resistor unit R1. The other terminal of the resistor unit R1 is connected to the ground 3. The cathode (N terminal) of the first unidirectional conduction unit D3 is electrically connected to the first terminal AC1 of the AC power supply AC. The anode (P terminal) of the first unidirectional conduction unit D3 is electrically connected to the ground 3. The cathode (N terminal) of the second unidirectional conduction unit D4 is electrically connected to the second terminal AC2 of the AC power supply AC. The anode (P terminal) of the second unidirectional conduction unit D4 is electrically connected to the ground 3. One terminal of the secondary side of the first transformer T1 is connected to the anode (P terminal) of the third unidirectional conduction unit D5. The cathode (N terminal) of the third unidirectional conducting unit D5 is connected to the positive terminal of the output capacitor Co. The other terminal of the secondary side of the first transformer T1 and the negative terminal of the output capacitor Co are connected to the ground 3. One terminal of the primary side of the second transformer T2 is located at the second terminal AC2 of the AC power supply AC. The other terminal of the primary side of the second transformer T2 is connected to one terminal of the third switching unit Q3. The other terminal of the third switching unit Q3 is connected to one terminal of the resistor unit R1. One end of the secondary side of the second transformer T2 is connected to the anode (P terminal) of the fourth unidirectional conducting unit D6. The cathode (N terminal) of the fourth unidirectional conducting unit D6 is connected to the positive terminal of the output capacitor Co. The other terminal of the secondary side of the second transformer T2 is connected to the ground 3.

Figure 3:
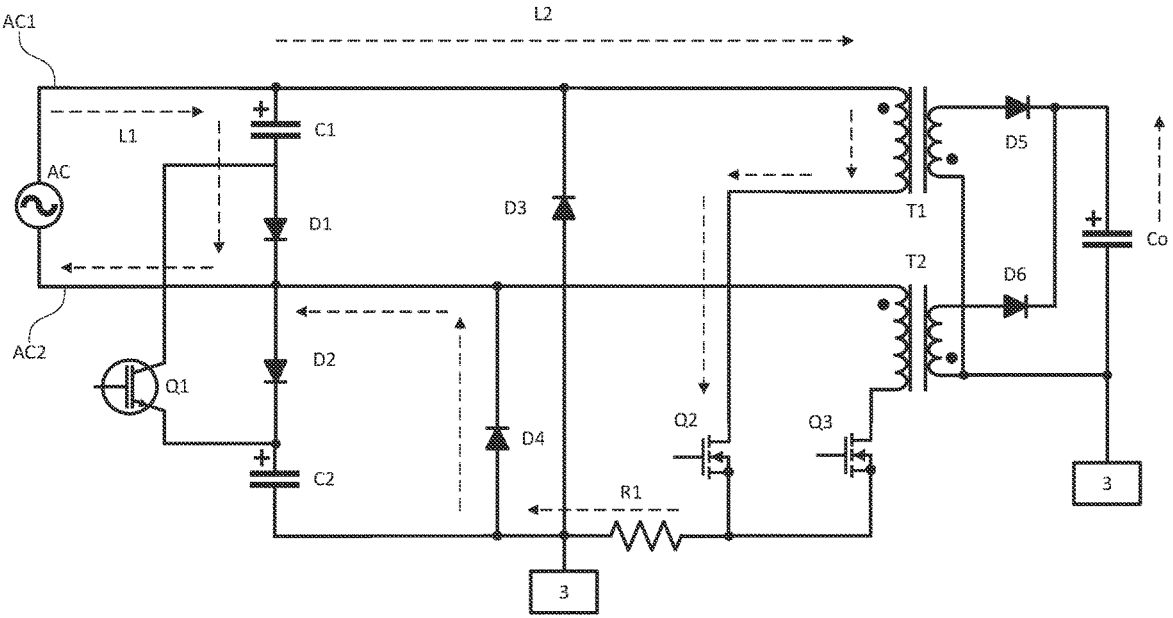
FIG. 3 is a schematic diagram of the circuit loop at the first time of the first embodiment of the present invention.

Please refer to FIG. 3. During the first time of the positive half cycle of the AC power supply, the second switching unit Q2 is in a conductive state and the first and third switching units Q1 and Q3 are in a non-conductive state to form a first loop L1 and a second loop L2. The power in the first loop L1 flows from the first terminal AC1 of the AC power supply through the positive terminal of the first energy storage unit C1 to charge the first energy storage unit C1, enters toward the anode (P terminal) of the first charging unit D1 from the negative terminal of the first energy storage unit C1, and returns back to the second terminal AC2 of the AC power supply through the cathode (N terminal) of the first charging unit D1. The power in the second loop L2 flows from the first terminal AC1 of the AC power supply, enters toward one terminal of the second switching unit Q2 from one terminal of the primary side of the first transformer T1 through the other terminal of the primary side of the first transformer T1, enters the anode (P terminal) of the first unidirectional conducting unit D3 from The other terminal of the second switching unit Q2 through the resistor unit R1, and returns to back to the second terminal AC2 of the AC power supply through the cathode (N terminal) of the first unidirectional conducting unit D3. The secondary side of the first transformer T1 outputs a reverse voltage to make the third unidirectional conduction unit D5 non-conductive in the reverse direction, so that the first transformer T1 stores energy and the positive terminal of the output capacitor Co discharges an external load (not shown).

Figure 4:
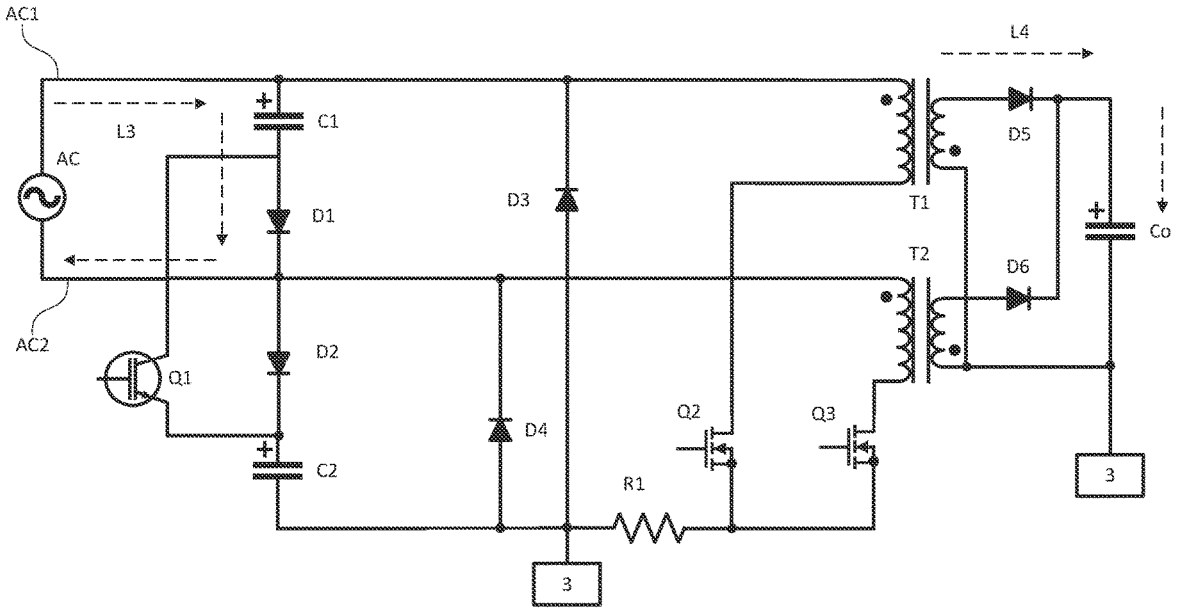
FIG. 4 is a schematic diagram of the circuit loop at the second time of the first embodiment of the present invention.

Please refer to FIG. 4. During the second time of the positive half cycle of the AC power supply, the first, second and third switching units Q1, Q2 and Q3 are in a non-conducting state to form a third loop L3 and a fourth loop L4. The power in the third loops charges the first energy storage unit C1 from the first terminal AC1 of the AC power supply through the positive terminal of the first energy storage unit C1, enters to the anode (P terminal) of the first charging unit D1 from the negative terminal of the first energy storage unit C1, and returns back to the second terminal AC2 of the AC power supply through The cathode (N terminal) of the first charging unit D1. The second switching unit Q2 is non-conductive so that the first transformer T1 releases its stored energy. The secondary side of the first transformer T1 outputs a forward voltage to form the fourth loop L4. The forward voltage in the fourth loop L4 is output from one terminal of the secondary side of the first transformer T1, forward-conducts the third unidirectional conduction unit D5 from the anode (P terminal) of the third unidirectional conduction unit D5, and enters to the positive side of the output capacitor Co from the Cathode (N terminal) of the third unidirectional conduction unit D5. The secondary side of the first transformer T1 charges the output capacitor Co and supplies power to the load (not shown).

Figure 5:
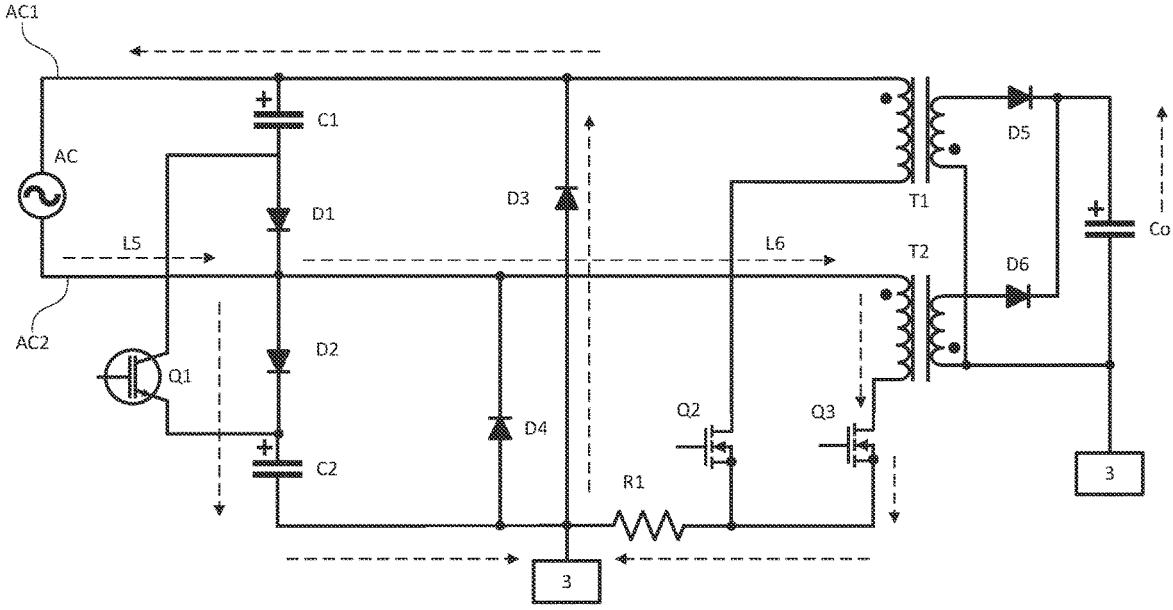
FIG. 5 is a schematic diagram of the circuit loop at the third time of the first embodiment of the present invention.

Please refer to FIG. 5. During the third time of the negative half cycle of the AC power supply, the third switching unit Q3 is in a conductive state and the first and second switching units Q1 and Q2 are in a non-conductive state to form a fifth loop L5 and a sixth loop L6. The power in the fifth loop L5 flows from the second terminal AC2 of the AC power supply, forward conducts the second charging unit D2 from the anode (P terminal) of the second charging unit D2, enters to the positive side of the second energy storage unit C2 from the cathode (N terminal) of the second charging unit D2 to C\charge the second energy storage unit C2, enters to the anode (P terminal) of the first unidirectional conducting unit D3 from The negative terminal of the second energy storage unit C2, and returns back to the first terminal AC1 of the AC power supply from the cathode (N terminal) of the first unidirectional conducting unit D3. The sixth loop L6 flows from the second terminal AC2 of the AC power supply to the primary side end of the second transformer T2, enters to one terminal of the third switching unit Q3 from the other terminal of the primary side of the second transformer T2, enter to the P end of the first unidirectional conduction unit D3 from the other terminal of the third switching unit Q3 through the resistor unit R1, and returns back to the first terminal AC1 of the AC power supply from the cathode (N terminal) of the first unidirectional conducting unit D3. The secondary side of the second transformer T2 outputs a reverse voltage to make the fourth unidirectional conduction unit D6 non-conductive in the reverse direction. The secondary side of the second transformer T2 outputs a reverse voltage to make the fourth unidirectional conduction unit D6 non-conductive in the reverse direction, allowing the second transformer T2 to store energy and the output capacitor Co to discharge the load (not shown).

Figure 6:
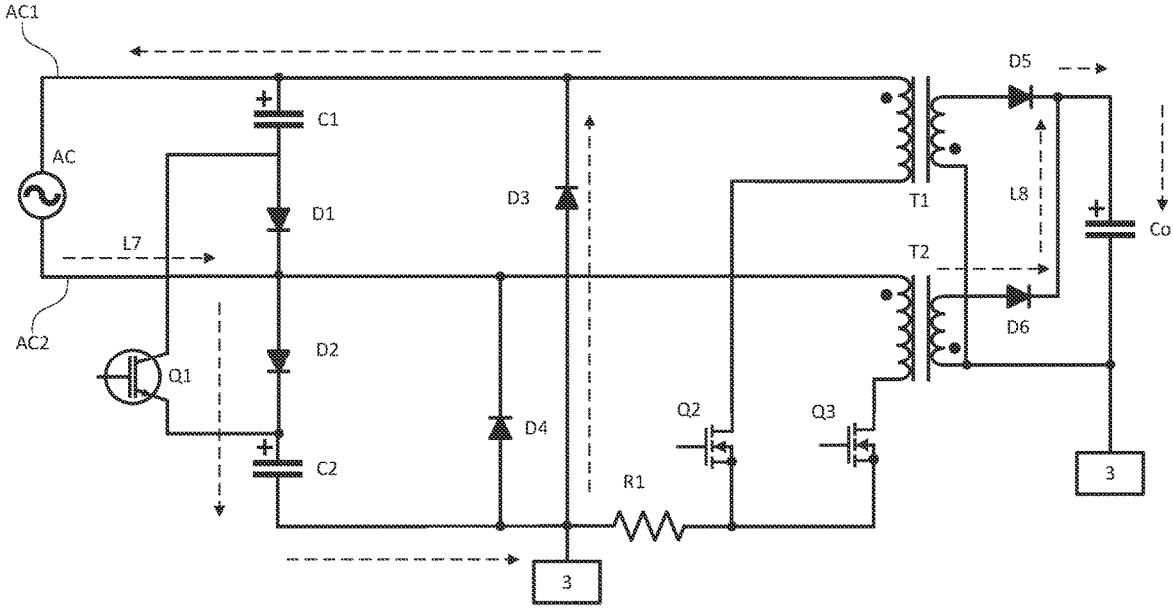
FIG. 6 is a schematic diagram of the circuit loop at the fourth time of the first embodiment of the present invention.

Please refer to FIG. 6. During the fourth time of the negative half cycle of the AC power supply, the first, second and third switching units Q1, Q2 and Q3 are in a non-conducting state to form a seventh loop L7 and an eighth loop L8. The power in the seventh loop L7 flows from the second terminal AC2 of the AC power supply, forward conducts the anode (P terminal) of the second charging unit D2, enters the anode terminal of the second energy storage unit C2 to charge the second energy storage unit C2 from The cathode (N terminal) of the second charging unit D2, enters the anode (P terminal) of the first unidirectional conduction unit D3 from The negative terminal of the second energy storage unit C2, and returns back to the first terminal AC1 of AC power from the cathode (N terminal) of the first unidirectional conducting unit D3. The third switching unit Q3 is non-conductive so that the second transformer T2 releases its stored energy. The secondary side of the second transformer T2 outputs a forward voltage to form the eighth loop L8. In the eighth loop L8 the forward voltage is output from the secondary end of the second transformer T2, forward conducts the anode (P terminal) of the fourth unidirectional conduction unit D6, and enters to the positive side of the output capacitor Co from the Cathode (N terminal) of the fourth unidirectional conduction unit D6. The secondary side of the second transformer T2 charges the output capacitor Co and supplies power to the load (not shown).

Figure 7:
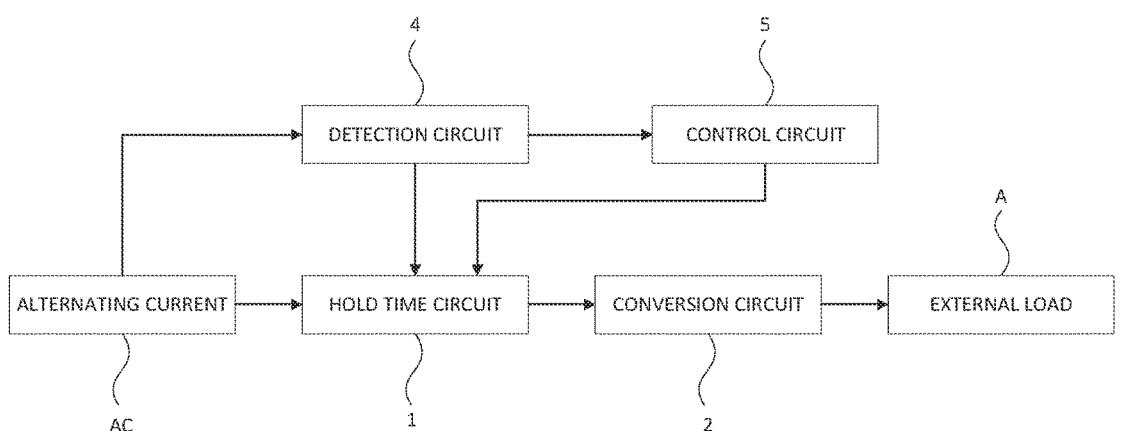
FIG. 7 is a schematic block diagram of an additional detection circuit according to the first embodiment of the present invention.

Please refer to FIG. 7. The embodiment can be further provided with a detection circuit 4 and a control circuit 5. The detection circuit 4 is AC coupled to the AC power supply. The detection circuit 4 is used to detect whether the output of the AC power supply is normal and whether the power supply is stable. When the AC power supply AC is open or disconnected, the detection circuit 4 drives the first switching unit Q1 to turn on to form a first discharge circuit DP1, a fifth time and a sixth time. The control circuit 5 is coupled to the detection circuit 4 and the first switching unit Q1. When the output of the AC power supply AC is abnormal, the control circuit 5 turns on the first switching unit Q1. Further, when the hold time circuit 1 also has the second switching unit Q2 and the third switching unit Q3, the control circuit 5 is further coupled with the second switching unit Q2 and the third switching unit Q3. When the output of the AC power supply is abnormal, the control circuit 5 turns on the first switching unit Q1 or turns on the second switching unit Q2 and the third switching unit Q3. In this embodiment, the abnormal output of the AC power supply indicates that the output of the AC power supply is zero.

Figure 8:
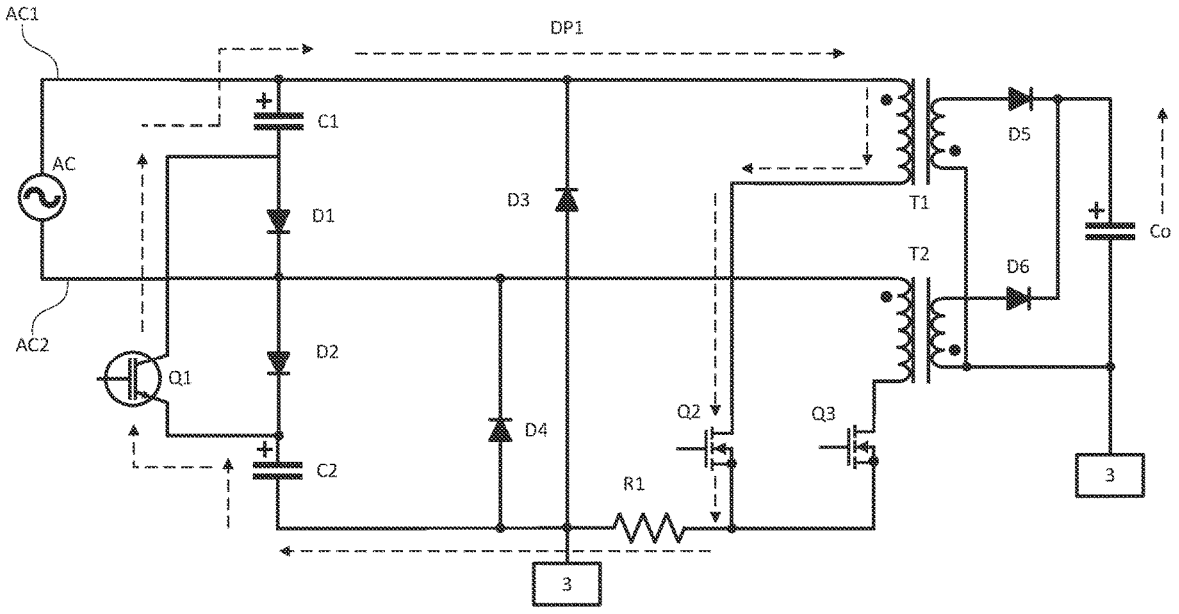
FIG. 8 is a schematic diagram of the circuit loop at the fifth time after the AC power supply is off according to the first embodiment of the present invention.

Please refer to FIG. 8. When the AC power supply AC is open-circuited for the fifth time, the second switching unit Q2 is conductive and the third switching unit Q3 is non-conductive. The first energy storage unit C1 and the second energy storage unit C2 are connected in series. The power in the first discharge circuit DP1 flows from the positive terminal of the first energy storage unit C1 to one terminal of the primary side of the first transformer T1, enters to one terminal of the second switching unit Q2, enters to the negative terminal of the second energy storage unit C2 through the Resistor unit R1 from the other terminal of the second switching unit Q2, and enters to the negative terminal of the first energy storage unit C1 through the First switching unit Q1 from the positive terminal of the second energy storage unit C2. The secondary side of the first transformer T1 outputs a reverse voltage to make the third unidirectional conduction unit D5 non-conductive in the reverse direction, allowing the first transformer T1 to store energy and the output capacitor Co to discharge to the load (not shown).

Figure 9:
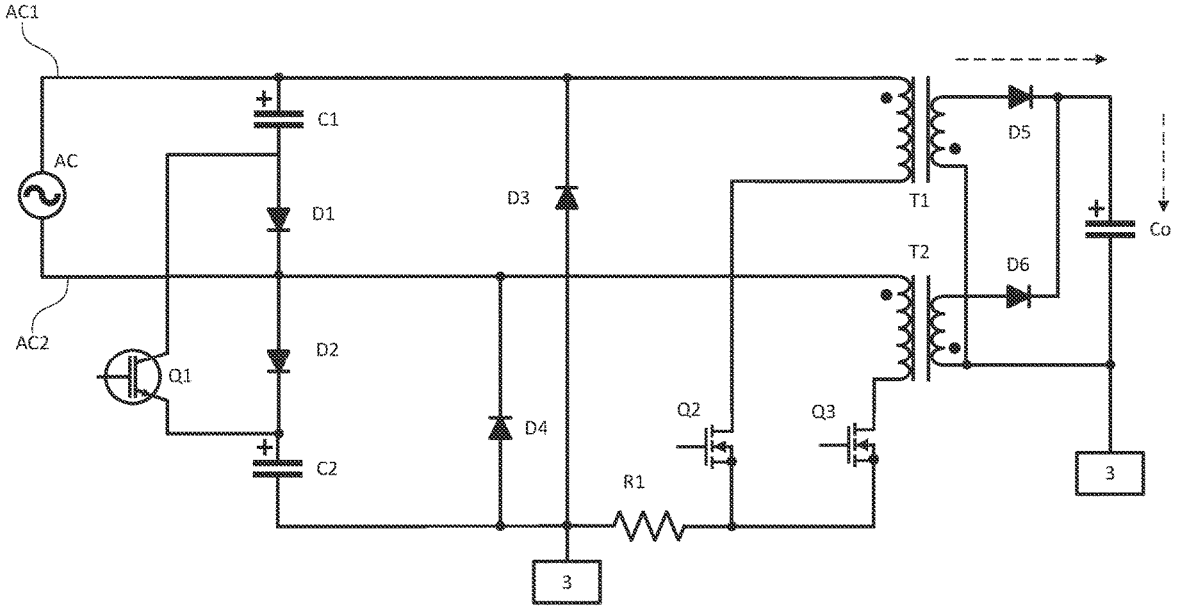
FIG. 9 is a schematic diagram of the circuit loop at the sixth time after the AC power supply is off according to the first embodiment of the present invention.

Please continue to refer to FIG. 9. When the AC power supply AC is open-circuited for the sixth time, the first switching unit Q1 is conductive and the second and third switching units Q2 and Q3 are non-conductive. The second switching unit Q2 is non-conductive so that the first transformer T1 releases its stored energy. A forward voltage is output from the secondary side of the first transformer T1, forward conducts the third unidirectional conduction unit D5 from the P terminal of the third unidirectional conduction unit D5, and enters to the positive side of the output capacitor Co from the N terminal of the third unidirectional conduction unit D5. The secondary side of the first transformer T1 charges the output capacitor Co and supplies power to the load (not shown).

During the first time of the positive half cycle or the third time of the negative half cycle of the AC power supply AC, the first energy storage unit C1 or the second energy storage unit C2 of the hold time circuit 1 is charged, and the first or second transformer T1, T2 of the conversion circuit 2 stores energy. Currently, the output capacitor Co supplies power to the external load A. When the AC power supply reaches the second time of the positive half cycle or the fourth time of the negative half cycle, the conversion circuit 2 releases the energy stored in the first transformer T1 or the second transformer T2 to charge the output capacitor Co and simultaneously supplies power to the external load A. When the AC power supply AC is open circuit, the first switching unit Q1 of the hold time circuit 1 is triggered to turn on, and the first second energy storage unit C1 and the second energy storage unit C2 provides power. At the fifth time, the second switching unit Q2 is in the conductive state and the first energy storage unit C1 and the second energy storage unit C2 continue to supply power to the first transformer T1 to store energy. At the sixth time, the second switching unit Q2 is in a non-conducting state, and the first transformer T1 releases its stored energy so that the secondary side of the first transformer T1 outputs the forward voltage to charge the output capacitor Co and supplies power to the external load A. In this way, the present invention can achieve the effect of extending the holding time through the first second energy storage units C1 and the second energy storage uni C2 after the AC power supply AC is opened.

The first and second time can be in sequential order or interleaved order. That is, in a positive half cycle, the first half cycle can be the first time and the second half cycle can be the second time, and vice versa. Alternatively, in the positive half cycle, the first time and the second time repeatedly perform cycles of charging, energy storage, releasing energy storage, and discharging. The third and fourth times or the fifth and sixth times can also be sequential or interleaved sequences.

Figure 10:
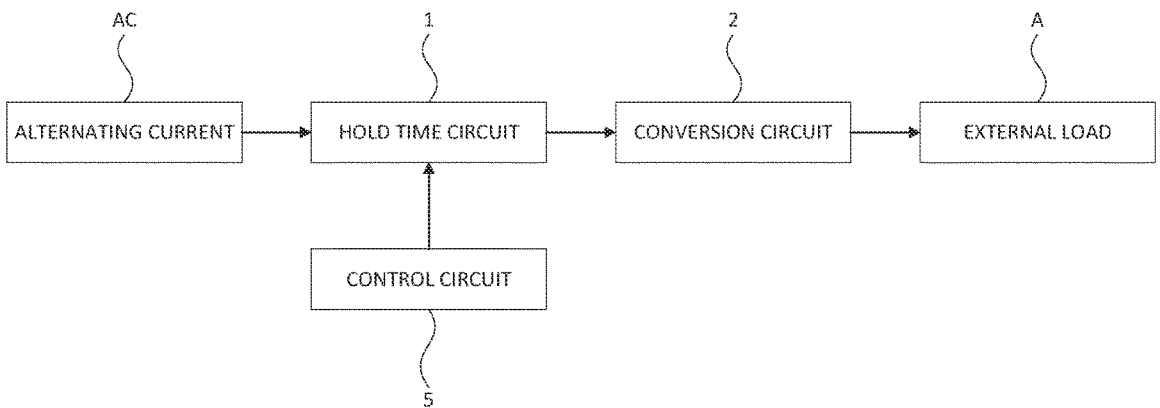
FIG. 10 is a schematic block diagram of a second embodi-ment of the present invention.
Figure 11:
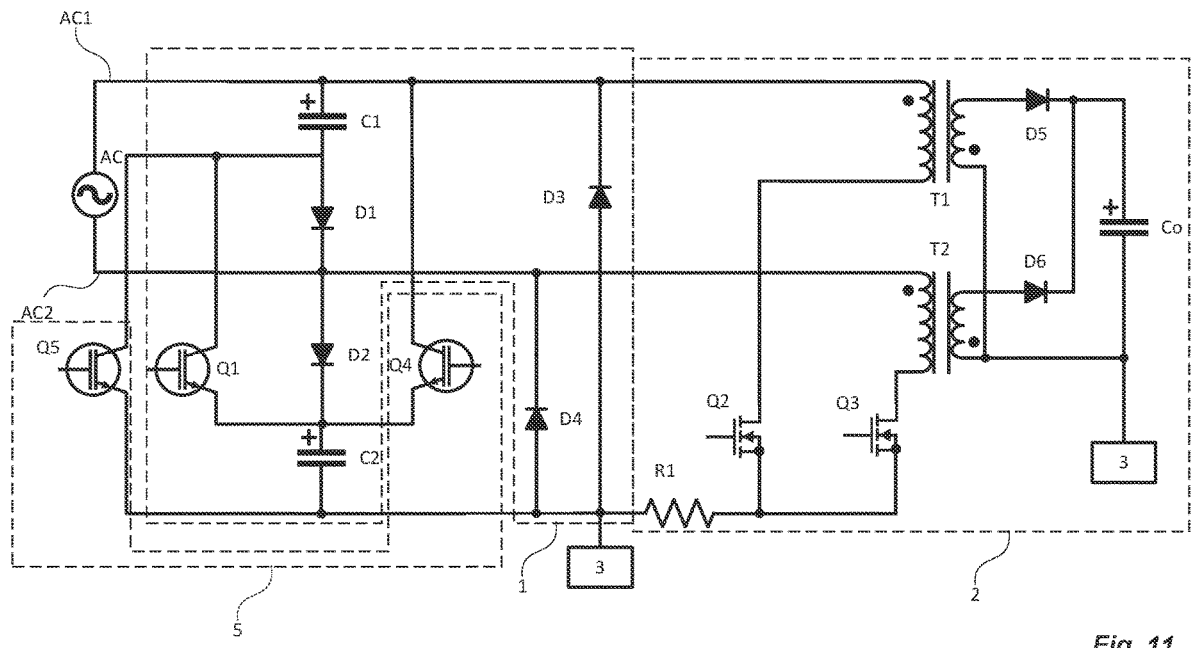
FIG. 11 is a schematic structural diagram of the second embodiment of the present invention.

Regarding the second embodiment of the present invention, the main disclosure is roughly the same as that of the first embodiment. Please refer to FIGS. 10 and 11. The second embodiment includes an AC power supply AC, a hold time circuit 1, a conversion circuit 2, and a control circuit 5, and an external load A.

The AC power supply AC has a first terminal AC1, a second terminal AC2, a positive half cycle and a negative half cycle. The positive half cycle has a first time and a second time, and the negative half cycle has a third time and a fourth time. The hold time circuit 1 is electrically connected to the first terminal AC1 and the second terminal AC2 of the AC power supply AC. The control circuit 5 is coupled to the hold time circuit 2. The conversion circuit 2 is electrically connected to the subsequent stage of the hold time circuit 1. The specific internal components and connection relationships of the hold time circuit 1 and the conversion circuit 2 are the same as those in the first embodiment of the present invention, so they will not be repeated hereinafter. The difference lies in the control circuit 5.

The control circuit 5 is provided with a third switching unit Q4 and a second switching unit Q5. One end of the third switching unit Q4 is connected to the first terminal AC1 of the AC power supply AC. The other terminal of the third switching unit Q4 is connected between the cathode (N terminal) of the second charging unit D2 and the anode end of the second energy storage unit C2. One end of the second switching unit Q5 is connected between the negative terminal of the first energy storage unit C1 and the anode (P terminal) of the first charging unit D1. The other terminal of the second switching unit Q5 is connected to the negative terminal of the second energy storage unit C2.

Figure 12:
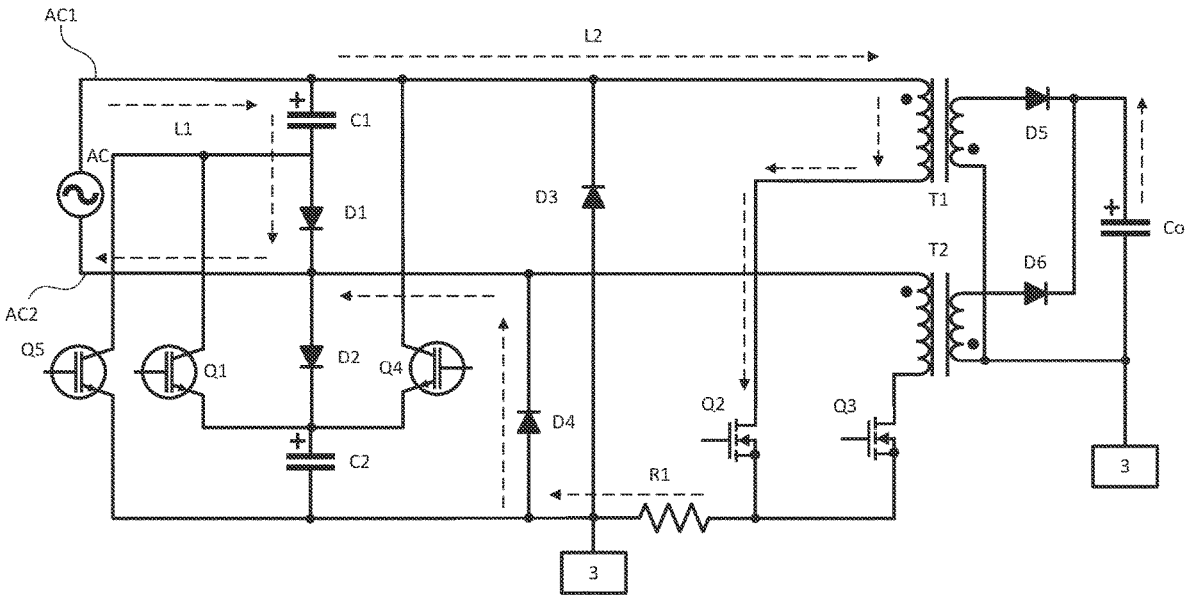
FIG. 12 is a schematic diagram of the circuit loop at the seventh time of the second embodiment of the present invention.

Please refer to FIG. 12. During the first time of the positive half cycle of the AC power supply, the second switching unit Q2 is in a conducting state and the first to third switching units Q1, Q2, and Q3 are in a non-conducting state to form a first loop L1 and a second loop L2. The actions of the first loop L1 and the second loop L2 are the same as the first time of the positive half cycle of the AC power supply AC in the first embodiment of the invention, so they would not be repeated hereinafter.

Figure 13:
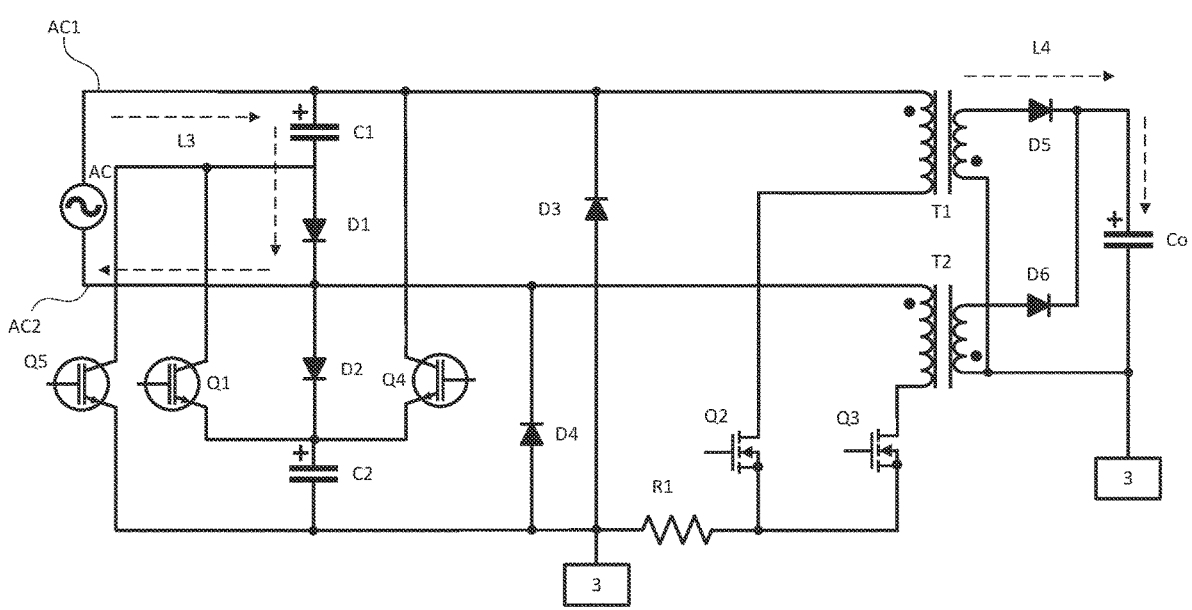
FIG. 13 is a schematic diagram of the circuit loop at the eighth time of the second embodiment of the present invention.

Please refer to FIG. 13. When the AC power supply AC reaches the second time of its positive half cycle, the first to third switching units Q1, Q2, and Q3 are in a non-conducting state to form a third loop L3 and a fourth loop L4. The actions of the third and fourth circuits L3 and L4 are the same as the second time of the positive half cycle of the AC power supply AC in the first embodiment of the invention, so they would not be repeated hereinafter.

Figure 14:
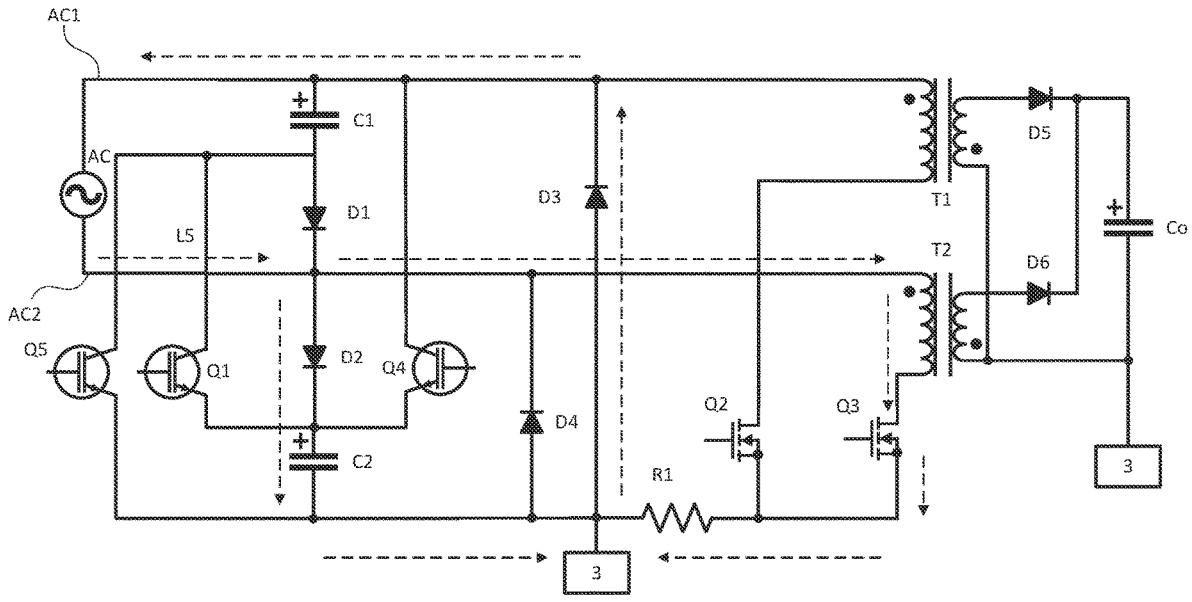
FIG. 14 is a schematic diagram of the circuit loop at the ninth time of the second embodiment of the present invention.

Please refer to FIG. 14. When the AC power supply AC reaches the third time of its negative half cycle, the third switching unit Q3 is in a conducting state and the first to third switching units Q1, Q2, and Q3 are in a non-conducting state to form a fifth loop L5 and a sixth loop L6. The actions of the fifth and sixth loops L5 and L6 are the same as the third time of the negative half cycle of the AC power supply AC in the first embodiment of the invention, so they would not be repeated hereinafter.

Figure 15:
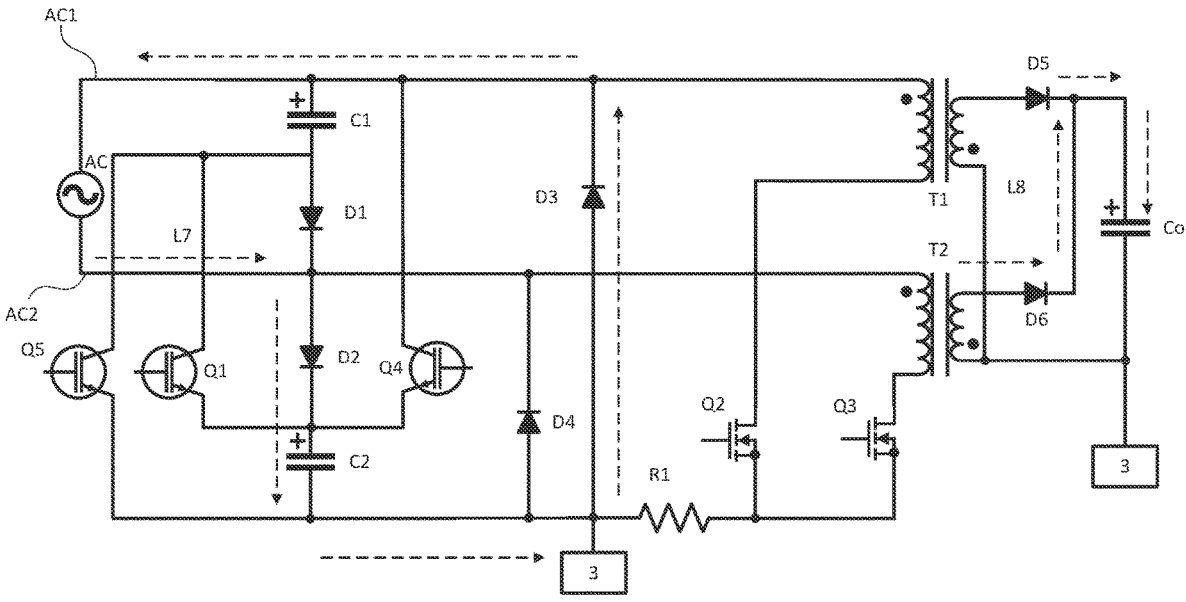
FIG. 15 is a schematic diagram of the circuit loop at the tenth time of the second embodiment of the present invention.

Please refer to FIG. 15. When the AC power supply AC reaches the fourth time of its negative half cycle, the first to third switching units Q1, Q2, and Q3 are in a non-conducting state to form a seventh loop L7 and an eighth loop L8. The actions of the seventh and eighth loops L7 and L8 are the same as the fourth time of the negative half cycle of the AC power supply AC in the first embodiment of the invention, so they would not be repeated hereinafter.

Figure 16:
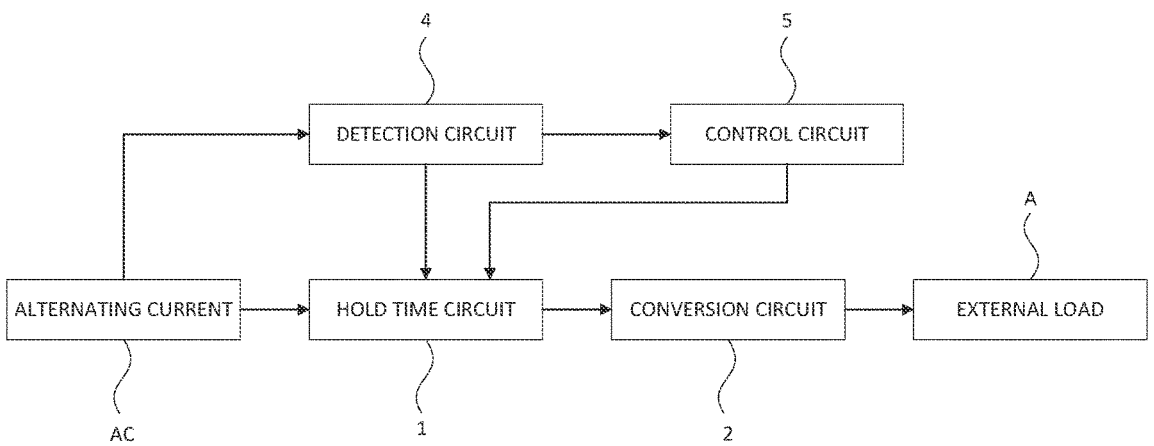
FIG. 16 is a schematic block diagram of an additional detection circuit according to the second embodiment of the present invention.

Please refer to FIG. 16. This embodiment can be further provided with a detection circuit 4 which has the same function as the first embodiment of the invention. The detection circuit 4 is also used to detect whether the AC power supply AC is open circuit. When the AC power supply AC is disconnected or open-circuited, the detection circuit 4 drives the first switching unit Q1 to turn on to form a second discharge circuit DP2, a first series time and a second series time, as shown in FIGS. 17 and 18.

Figure 17:
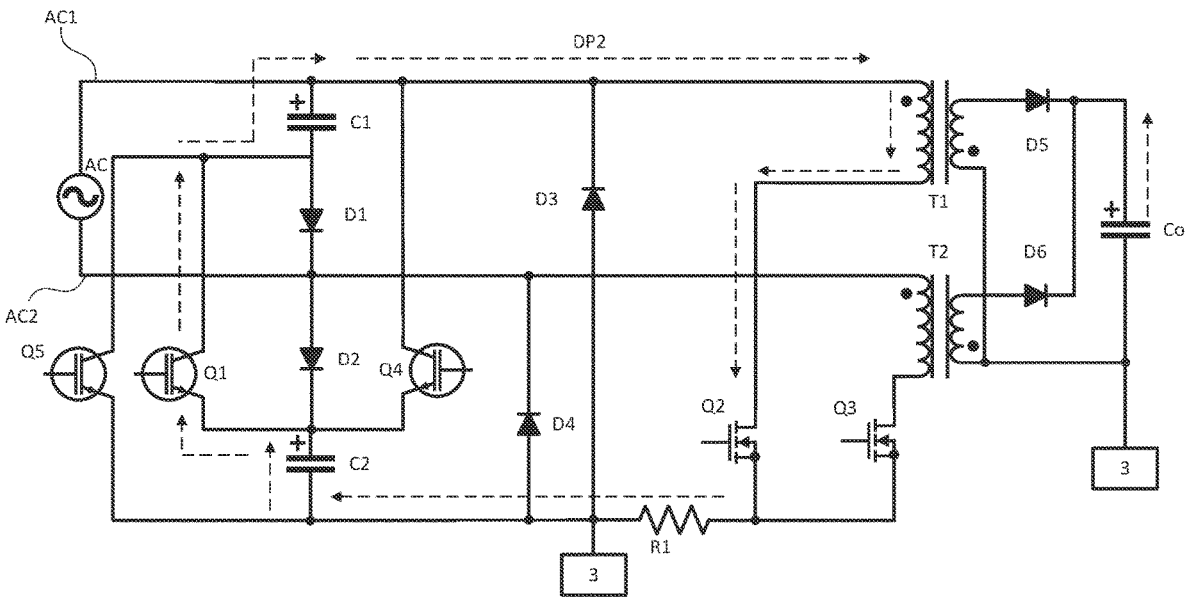
FIG. 17 is a schematic circuit diagram of the first series time after the AC power supply is off according to the second embodiment of the present invention.

Please refer to FIG. 17. During the first series time, the second switching unit Q2 is conductive and the third and second switching units Q3 and Q2 are not conductive. The first second energy storage unit C1 and the second energy storage unit C2 are connected in series. The power in the second discharge loop DP2 flows from the positive terminal of the first energy storage unit C1 to one terminal of the primary side of the first transformer T1, enters to one terminal of the second switching unit Q2 from the other terminal of the primary side of the first transformer T1, enters to the negative terminal of the second energy storage unit C2 through the resistor unit R1 from the other terminal of the second switching unit Q2, and enters to the negative terminal of the first energy storage unit C1 through the first switching unit Q1 from the positive terminal of the second energy storage unit C2. The secondary side of the first transformer T1 outputs a reverse voltage to make the third unidirectional conduction unit D5 non-conductive in the reverse direction, so that the first transformer T1 stores energy and the output capacitor Co discharges to the external load A.

Figure 18:
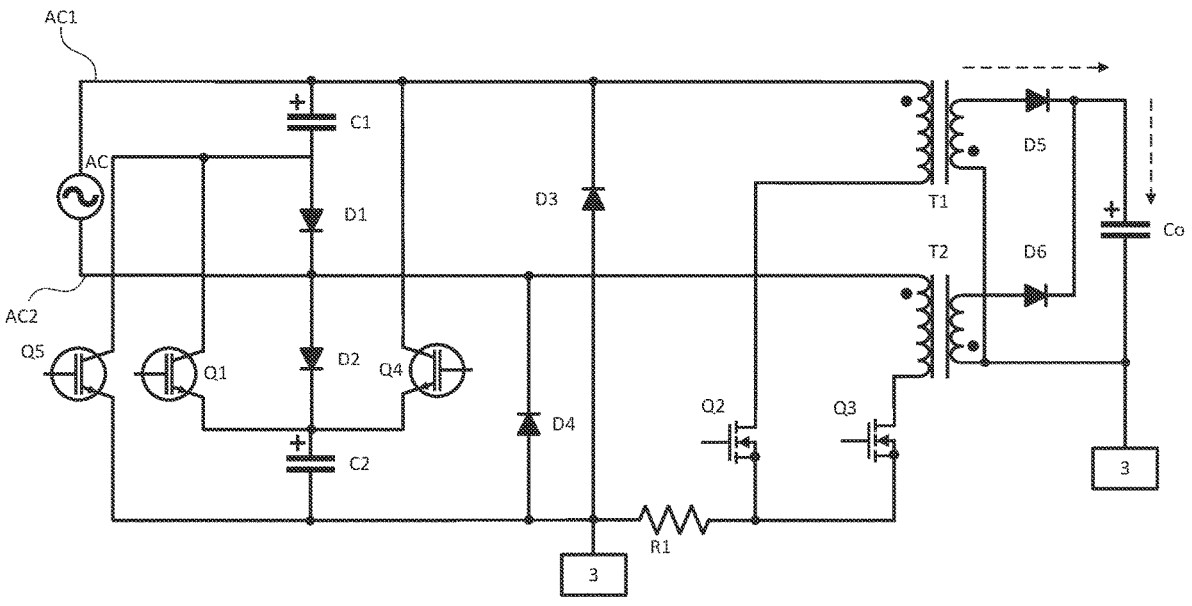
FIG. 18 is a schematic circuit diagram of the second series time after the AC power supply is off according to the second embodiment of the present invention.

Please refer to FIG. 18. During the second series time, the first switching unit Q1 is conductive and the second and third switching units Q2 and Q3 are non-conductive. The second switching unit Q2 is non-conductive so that the first transformer T1 releases its stored energy. A forward voltage is output from one terminal of the secondary side of the first transformer T1, and forward conducts the third unidirectional conduction unit D5 from the anode (P terminal) of the third unidirectional conduction unit D5, and flows to the positive side of the output capacitor Co from the cathode (N terminal) of the third unidirectional conduction unit D5. The secondary side of the first transformer T1 charges the output capacitor Co and supplies power to the external load A.

The operation for the charging and discharging of the AC power supply AC at the first time and second time of the positive half cycle and the third time and fourth time of the negative half cycle are the same as those in the first embodiment, and would not be repeated hereinafter. The difference is that when the AC power supply AC is open circuit, the first switching unit Q1 of the hold time circuit 1 is triggered to turn on. During the first series time, the first energy storage units C1 and the second energy storage unit C2 are connected in series to supply power and the second switching unit Q2 is conducting while the second switching unit Q2 and the third switching unit Q3 are not conducting, so that the first transformer T1 stores energy. During the second time of series connection, the second and third switching units Q2 and Q3 are in a non-conducting state, and the first transformer T1 releases its stored energy to cause the secondary side of the first transformer T1 to output the forward voltage pair. The output capacitor Co charges and supplies power to the external load A at the same time. In this way, the present invention can achieve the effect of extending the holding time through the first energy storage unit C1 and the second energy storage unit C2 after the AC power supply AC is opened.

In this embodiment, when the first energy storage unit C1 and the second energy storage unit C2 are connected in series, the total capacitance value decreases. During the charging process, the first energy storage unit C1 and the second energy storage unit C2 are respectively charged through the first time of the positive half cycle and the third time of the negative half cycle. The charge amount of the first energy storage unit C1 and the second energy storage unit C2 would not be reduced as a result. Therefore, the output voltage values of the first and second energy storage units can be increased, making this embodiment applicable to situations with high power requirements and achieving the effect of extending the holding time at the same time.

Figure 19:
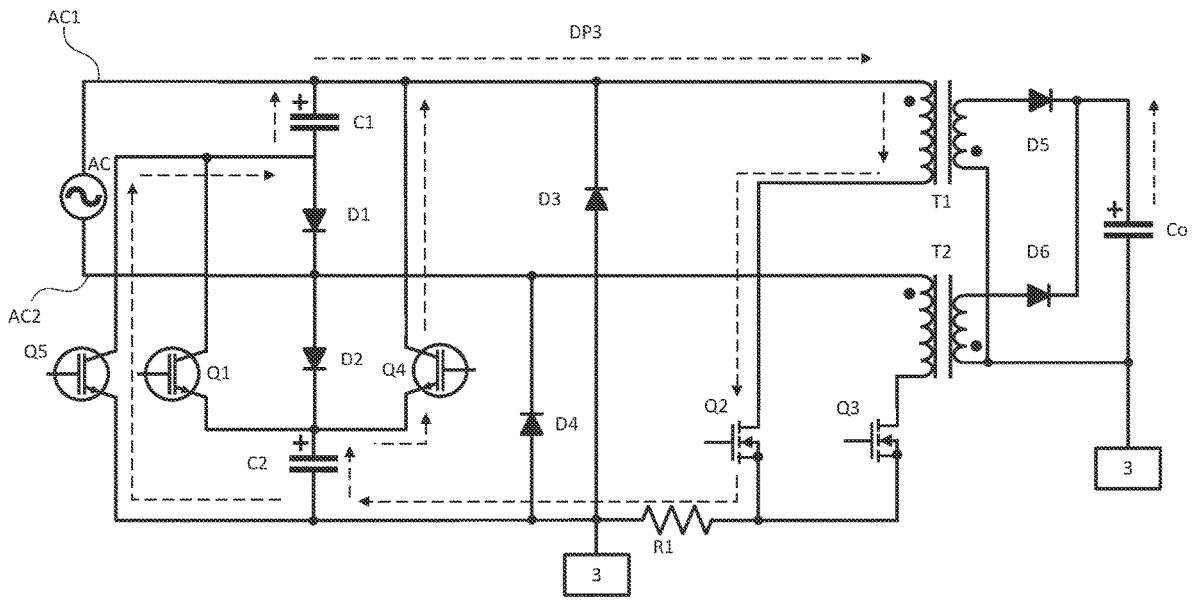
FIG. 19 is a schematic circuit diagram of the first parallel time after the AC power supply is off according to the second embodiment of the present invention.
Figure 20:
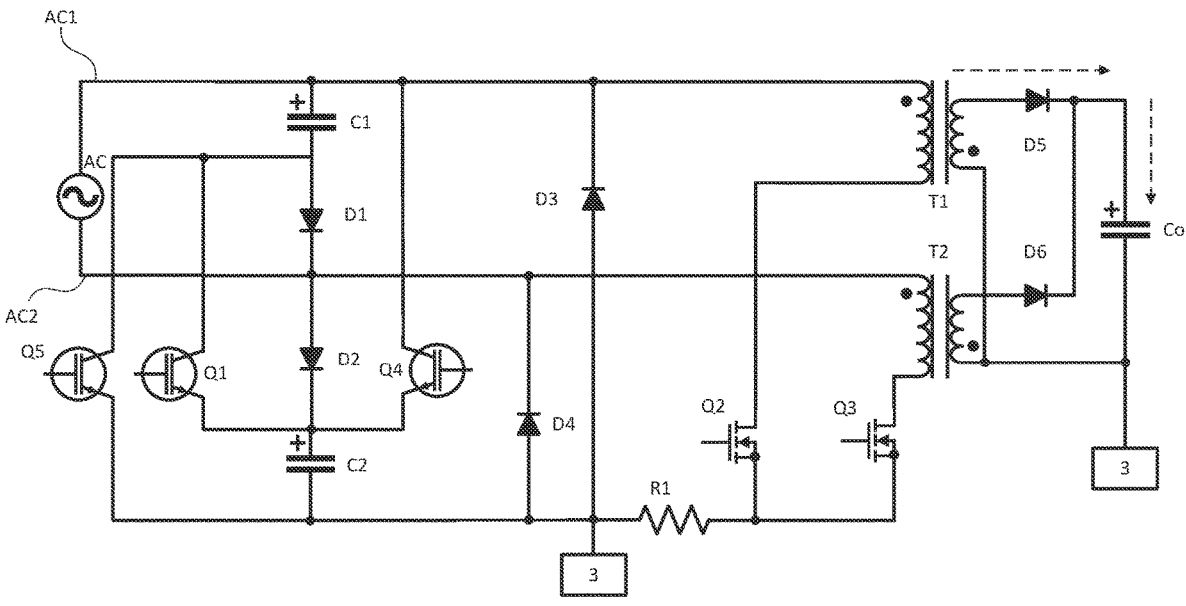
FIG. 20 is a schematic circuit diagram of the second parallel time after the AC power supply is off according to the second embodiment of the present invention.

In another embodiment, when the detection circuit 4 detects that the AC power supply AC is disconnected or open-circuited, the detection circuit 4 drives the second switching unit Q2 and the third switching units Q3 to conduct to form a third discharge circuit DP3, a first parallel time and a second parallel time, as shown in FIGS. 19 and 20.

Please refer to FIG. 19. During the first parallel time, the second switching unit Q2 is conductive and the first switching unit Q1 and the third switching unit Q3 are non-conductive, causing the first energy storage unit C1 and the second energy storage unit C2 to be connected in parallel. The power in the third discharge loop DP3 flows from the positive terminal of the first energy storage unit C1 and the positive terminal of the second energy storage unit C2 to one terminal of the primary side of the first transformer T1, enters to one terminal of the second switching unit Q2 from the other terminal of the primary side of the first transformer T1, enters to the negative terminal of the second energy storage unit C2 through the resistor unit R1 from the other terminal of the second switching unit Q2, enters to the negative terminal of the first energy storage unit C1 through the third switching unit Q4, and enters to the positive terminal of the first energy storage unit C1 through the second switching unit Q5 from the positive terminal of the second energy storage unit C2. The secondary side of the first transformer T1 outputs a reverse voltage to make the third unidirectional conduction unit D5 non-conductive in the reverse direction, so that the first transformer T1 stores energy and the output capacitor Co discharges to the external load A.

Please refer to FIG. 20. During the second parallel time, the second switching unit Q2 and the third switching unit Q3 are conductive and the first, second and third switching units Q1, Q2 and Q3 are non-conductive. The second switching unit Q2 is non-conductive, causing the first transformer T1 to release its stored energy. One end of the secondary side of the first transformer T1 outputs a forward voltage, which forward conducts the anode (P terminal) of the third unidirectional conduction unit D5 and then enters the positive side of the output capacitor Co from the cathode (N terminal) of the third unidirectional conduction unit D5. The secondary side of the first transformer T1 charges the output capacitor Co and supplies power to the external load A.

The operation for the charging and discharging of the AC power supply AC at the first time and second time of the positive half cycle and the third time and fourth time of the negative half cycle are the same as those in the first embodiment, and would not be repeated hereinafter. The difference is that when the AC power supply AC is open circuit, the third and second switching units Q4 and Q5 of the hold time circuit 1 is triggered to turn on. During the first parallel time, the first and second energy storage units C1 and C2 are connected in parallel to supply power and the second switching unit Q2 is conductive and the first and third switching units Q1 and Q3 are non-conductive, allowing the first transformer T1 to store energy. During the second parallel time, the first, second and third switching units Q1, Q2 and Q3 are in a non-conducting state, the first transformer T1 releases its stored energy so that the secondary side of the first transformer T1 outputs the forward voltage to the output to charge the capacitor Co and supplies power to the external load A at the same time. In this way, the present invention can achieve the effect of extending the holding time through the first and second energy storage units C1 and C2 after the AC power supply AC is opened.

In this embodiment, when the first and second energy storage units C1 and C2 are connected in parallel, their total capacitance increases. During the charging process, the first and second energy storage units C1 and C2 are respectively charged through the first time of the positive half cycle and the third time of the negative half cycle. The charge amount of the first and second energy storage units C1 and C2 is not reduced as a result. Therefore, the output voltage values of the first and second energy storage units is reduced. In addition, this embodiment can be applied to situations where the output voltage needs to be reduced and at the same time, and the effect of extending the holding time can be achieved.

The first and second times may be in sequential order or interleaved order. That is, in a positive half cycle, the first half of the cycle can be the first time and the second half of the cycle can be the second time, and vice versa. In the positive half cycle, the cycle of charging, energy storage, energy storage, and discharge can be repeatedly executed for the first time and the second time. The third and fourth time or the first series time and the second series time or the first parallel time and the second parallel time\may also be in sequential order or in an interleaved order.

It is to be understood that the term "comprises", "comprising", or any other variants thereof, is intended to encompass a non-exclusive inclusion, such that a process, method, article, or device of a series of elements not only comprise those elements but further comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A power converter, comprising:
a hold time circuit, comprising a first energy storage unit, a second energy storage unit, a first charging unit, a second charging unit and a first switching unit, wherein the first energy storage unit, the second energy storage unit, the first charging unit and the second charging unit are connected in series, and the first switching unit is connected in parallel with a series path formed by the first charging unit and the second charging unit; and
a conversion circuit electrically connected to the hold time circuit;
wherein when the first switching unit is turned on, the first energy storage unit and the second energy storage unit are connected in series and discharge power to the conversion circuit,
wherein the conversion circuit comprises a first transformer, a second transformer, a second switching unit, a third switching unit, a first unidirectional conduction unit, a second unidirectional conduction unit, a third unidirectional conduction unit, a fourth unidirectional conduction unit and an output capacitor:
a primary side of the first transformer is electrically connected to the first energy storage unit, the first unidirectional conduction unit, the second switching unit and an AC power supply;
a secondary side of the first transformer is electrically connected to the third unidirectional conduction unit and the output capacitor; and
a primary side of the second transformer is electrically connected to the first charging unit, the second charging unit, the second unidirectional conduction unit, the third switching unit and the AC power supply,
wherein the hold time circuit further comprises:
a fourth switching unit, connected in parallel with a series path formed by the first charging unit, the second charging unit and the second energy storage unit; and
a fifth switching unit, connected in parallel with a series path formed by the first energy storage unit, the first charging unit and the second charging unit;
wherein, when the first switching unit is turned off, and the fourth switching unit and the fifth switching unit are turned on, the first energy storage unit and the second energy storage unit are connected in parallel and discharged to the conversion circuit, and
the power converter further comprises:
a detection circuit coupled to the AC power supply and configured to detect abnormalities of an output of the AC power supply; and
a control circuit coupled to the detection circuit, the first switching unit, the fourth switching unit and the fifth switching unit, when the output of the AC power supply is abnormal, the control circuit turns on the first switching unit or turns on the fourth switching unit and the fifth switching unit.

2. The power converter according to claim 1, wherein the output of the AC power supply being abnormal indicates that the output of the AC power supply is zero.

3. The power converter according to claim 1, wherein the AC power supply has a positive half cycle and a negative half cycle; the positive half cycle has a first time and a second time; at the first time, the second switching unit is turned on and the first transformer stores energy; at the second time, the second switching unit is turned off and the first transformer releases the stored energy.

4. The power converter according to claim 3, wherein the negative half cycle has a third time and a fourth time; at the third time, the third switching unit is turned on and the second transformer stores energy; at the fourth time, the third switching unit is turned off and the second transformer releases the stored energy.

5. The power converter according to claim 1, wherein the hold time circuit is electrically connected to the AC power supply; the AC power supply charges the first energy storage unit during a positive half cycle, and the AC power supply charges the second energy storage unit during a negative half cycle.

6. A power conversion system, electrically connected to a load, the power conversion system comprising:
a hold time circuit, electrically connected to an AC power supply and comprising a first energy storage unit, a second energy storage unit, a first charging unit, a second charging unit and a first switching unit, wherein the first energy storage unit, the second energy storage unit, the first charging unit and the second charging unit are connected in series, and the first switching unit is connected in parallel with a series path formed by the first charging unit and the second charging unit; and
a conversion circuit electrically connected to the hold time circuit;
wherein when the first switching unit is turned on, the first energy storage unit and the second energy storage unit are connected in series and discharged to the conversion circuit,
wherein:
the first energy storage unit has a positive terminal and a negative terminal;
the second energy storage unit has a positive terminal and a negative terminal;
the first charging unit has an anode and a cathode;
the second charging unit has an anode and a cathode;
the positive terminal of the first energy storage unit is electrically connected to a first terminal of the AC power supply, and the negative terminal of the first energy storage unit is connected to the anode of the first charging unit;
the cathode of the first charging unit is connected to a second terminal of the AC power supply and to the anode of the second charging unit;
the cathode of the second charging unit is connected to the positive terminal of the second energy storage unit;
the negative terminal of the second energy storage unit is connected to a ground;
one terminal of the first switching unit is configured between the negative terminal of the first energy storage unit and the anode of the first charging unit; the other terminal of the first switching unit is configured between the cathode of the second charging unit and the positive terminal of the second energy storage unit;

the conversion circuit comprises a first transformer, a second switching unit, a resistor unit, a second transformer, a third switching unit, a first unidirectional conduction unit, a second unidirectional conduction unit, and a third unidirectional conduction unit, a fourth unidirectional conduction unit and an output capacitor;

the first transformer and the second transformer respectively have a primary side and a secondary side;

the first unidirectional conduction unit, the second unidirectional conduction unit, the third unidirectional conduction unit and the fourth unidirectional conduction unit respectively has an anode and a cathode;

the output capacitor has a positive terminal and a negative terminal;

one terminal of the primary side of the first transformer is configured at to the first terminal of the AC power supply, and the other terminal of the primary side of the first transformer is connected to one terminal of the second switching unit;

the other terminal of the second switching unit is connected to one terminal of the resistor unit;

the other terminal of the resistor unit is connected to the ground;

the cathode of the first unidirectional conduction unit is electrically connected to the first terminal of the AC power supply, and the anode of the first unidirectional conduction unit is electrically connected to the ground;

the cathode of the second unidirectional conduction unit is electrically connected to the second terminal of the AC power supply, and the anode of the second unidirectional conduction unit is electrically connected to the ground;

one terminal of the secondary side of the first transformer is connected to the anode of the third unidirectional conduction unit, and the cathode of the third unidirectional conduction unit is connected to the positive terminal of the output capacitor;

the other terminal of the secondary side of the first transformer is connected to the negative terminal of the output capacitor;

one terminal of the primary side of the second transformer is connected to the second terminal of the AC power supply, and the other terminal of the primary side of the second transformer is connected to one terminal of the third switching unit;

the other terminal of the third switching unit is connected to the one terminal of the resistor unit;

one terminal of the secondary side of the second transformer is connected to the anode of the fourth unidirectional conduction unit; and the cathode of the fourth unidirectional conducting unit is connected to the positive terminal of the output capacitor.

7. The power conversion system according to claim 6, wherein the AC power supply has a positive half cycle and a negative half cycle;

at a first time of the positive half cycle, the second switching unit is in a conducting state and the first switching unit, the third switching unit, a fourth switching unit and a fifth switching unit are in a non-conducting state to form a first loop and a second loop;

wherein power in the first loop flows from the first terminal of the AC power supply through the positive terminal of the first energy storage unit to charge the first energy storage unit, enters the anode of the first charging unit from the negative terminal of the first energy storage unit, and returns to the second terminal of the AC power supply through the cathode of the first charging unit;

wherein power in the second loop flows from the first terminal of the AC power supply, enters the one terminal of the second switching unit from the one terminal of the primary side of the first transformer through the other terminal of the primary side of the first transformer, enters the anode of the second unidirectional conducting unit from the other terminal of the second switching unit through the resistor unit, and returns to the second terminal of the AC power supply through the cathode of the second unidirectional conducting unit; and wherein the secondary side of the first transformer outputs a reverse voltage to make the third unidirectional conduction unit non-conductive in a reverse direction, so that the first transformer stores energy and the positive terminal of the output capacitor discharges power to the load.

8. The power conversion system according to claim 7, wherein at a second time of the positive half cycle, the first switching unit, the second switching unit, the third switching unit, the fourth switching unit and the fifth switching unit are in a non-conducting state to form a third loop and a fourth loop;

wherein power in the third loop charges the first energy storage unit from the first terminal of the AC power supply through the positive terminal of the first energy storage unit, enters to the anode of the first charging unit from the negative terminal of the first energy storage unit, and returns to the second terminal of the AC power supply through the cathode of the first charging unit; and wherein the second switching unit is non-conductive so that the first transformer releases stored energy; the secondary side of the first transformer outputs a forward voltage to form the fourth loop; the forward voltage in the fourth loop is output from the one terminal of the secondary side of the first transformer, conducts the third unidirectional conduction unit from the anode of the third unidirectional conduction unit, and enters to the positive side of the output capacitor from the cathode of the third unidirectional conduction unit; the secondary side of the first transformer charges the output capacitor and supplies power to the load.

9. The power conversion system according to claim 8, wherein at a third time of the negative half cycle, the third switching unit is in a conducting state and the first switching unit, the second switching unit, the fourth switching unit and the fifth switching unit are in a non-conducting state to form a fifth loop and a sixth loop;

wherein power in the fifth loop flows from the second terminal of the AC power supply, conducts the second charging unit from the anode of the second charging unit, enters to the positive side of the second energy storage unit from the cathode of the second charging unit to charge the second energy storage unit, enters to the anode of the first unidirectional conducting unit from the negative terminal of the second energy storage unit, and returns to the first terminal of the AC power supply from the cathode of the first unidirectional conducting unit;

wherein the sixth loop flows from the second terminal of the AC power supply to the first terminal of the primary side of the second transformer, enters to the one terminal of the third switching unit from the other terminal of the primary side of the second transformer, enter to the anode of the first unidirectional conduction unit from the other terminal of the third switching unit through the resistor unit, and returns to the first terminal of the AC power supply from the cathode of the first unidirectional conducting unit; and wherein the secondary side of the second transformer outputs a reverse voltage to make the fourth unidirectional conduction unit non-conductive in a reverse direction, allowing the second transformer to store energy and the output capacitor to discharge power to the load.

10. The power conversion system according to claim 9, wherein at a fourth time of the negative half cycle, the first switching unit, the second switching unit, the third switching unit, the fourth switching unit and the fifth switching unit are in a non-conducting state to form a seventh loop and an eighth loop;

wherein power in the seventh loop flows from the second terminal of the AC power supply, conducts the anode of the second charging unit, enters the anode terminal of the second energy storage unit to charge the second energy storage unit from the cathode of the second charging unit, enters the anode of the first unidirectional conduction unit from the negative terminal of the second energy storage unit, and returns to the first terminal of the AC power supply from the cathode of the first unidirectional conducting unit;

wherein the third switching unit is non-conductive so that the second transformer releases stored energy;

wherein the secondary side of the second transformer outputs a forward voltage to form the eighth loop; in the eighth loop the forward voltage is output from the first terminal of the secondary side of the second transformer, conducts the anode of the fourth unidirectional conduction unit, and enters to the positive side of the output capacitor from the cathode of the fourth unidirectional conduction unit; and wherein the secondary side of the second transformer charges the output capacitor and supplies power to the load.

11. The power conversion system according to claim 10, further comprising a detection circuit; the detection circuit detects that the AC power supply is open-circuited, the detection circuit drives the first switching unit to turn on to form a second discharge circuit, a first series time and a second series time;

wherein during the first series time, the second switching unit is conductive and the fourth and fifth switching units are not conductive, the first energy storage unit and the second energy storage unit are connected in series; power in the second discharge loop flows from the positive terminal of the first energy storage unit to the one terminal of the primary side of the first transformer, enters to the one terminal of the second switching unit from the other terminal of the primary side of the first transformer, enters to the negative terminal of the second energy storage unit through the resistor unit from the other terminal of the second switching unit, and enters to the negative terminal of the first energy storage unit through the first switching unit from the positive terminal of the second energy storage unit; and wherein the secondary side of the first transformer outputs a reverse voltage to make the third unidirectional conduction unit non-conductive in a reverse direction, so that the first transformer stores energy and the output capacitor discharges power to the load.

12. The power conversion system according to claim 11, wherein during the second series time, the first switching unit is conductive and the second and third switching units are non-conductive; the second switching unit is non-conductive so that the first transformer releases stored energy; the voltage is output from the one terminal of the secondary side of the first transformer, and conducts the third unidirectional conduction unit from the anode of the third unidirectional conduction unit, and flows to the positive side of the output capacitor from the cathode of the third unidirectional conduction unit;

wherein the secondary side of the first transformer charges the output capacitor and supplies power to the load.

13. The power conversion system according to claim 10, further comprises a detection circuit, when the detection circuit detects that the AC power supply is disconnected or open-circuited, the detection circuit drives the fourth switching unit and the fifth switching unit to turn on to form a third discharge circuit, a first parallel time and a second parallel time;

wherein during the first parallel time, the second switching unit is conductive and the first switching unit and the third switching unit are non-conductive, causing the first energy storage unit and the second energy storage unit to be connected in parallel; power in the third discharge loop flows from the positive terminal of the first energy storage unit and the positive terminal of the second energy storage unit to the one terminal of the primary side of the first transformer, enters to the one terminal of the second switching unit from the other terminal of the primary side of the first transformer, enters to the negative terminal of the second energy storage unit through the resistor unit from the other terminal of the second switching unit, enters to the negative terminal of the first energy storage unit through the third switching unit, and enters to the positive terminal of the first energy storage unit through the fourth switching unit from the positive terminal of the second energy storage unit; and wherein the secondary side of the first transformer outputs a reverse voltage to make the third unidirectional conduction unit non-conductive in a reverse direction, so that the first transformer stores energy and the output capacitor discharges power to the load.

14. The power conversion system according to claim 13, wherein during the second parallel time, the fourth switching unit and the fifth switching unit are conductive and the first switching unit, the second switching unit and the third switching unit are non-conductive; the second switching unit is non-conductive, causing the first transformer to release stored energy; the one terminal of the secondary side of the first transformer outputs the forward voltage, which conducts the anode of the third unidirectional conduction unit and then enters the positive side of the output capacitor from the cathode of the third unidirectional conduction unit; and wherein the secondary side of the first transformer charges the output capacitor and supplies power to the load.

* * * * *